United States Patent [19]

Itoh et al.

[11] 4,358,540
[45] Nov. 9, 1982

[54] COMPOSTING APPARATUS

[75] Inventors: Kanichi Itoh, Yokohama; Yoshio Hirayama, Zushi; Masanori Kodaira, Tokyo, all of Japan

[73] Assignee: Ebara Corporation, Tokyo, Japan

[21] Appl. No.: 199,784

[22] PCT Filed: Oct. 9, 1978

[86] PCT No.: PCT/JP78/00006

§ 371 Date: Jun. 8, 1979

§ 102(e) Date: Jun. 7, 1979

[87] PCT Pub. No.: WO79/00216

PCT Pub. Date: May 3, 1979

[30] Foreign Application Priority Data

Oct. 8, 1977 [JP] Japan ................................ 52-121049

[51] Int. Cl.³ .............................................. C12M 1/02
[52] U.S. Cl. .......................................... 435/316; 71/9;
422/193; 422/195; 435/315
[58] Field of Search ...................... 71/9; 422/193, 195;
435/315, 316, 818

[56] References Cited

U.S. PATENT DOCUMENTS

| 492,551 | 2/1893 | Frasch | 422/195 X |
|---|---|---|---|
| 2,178,818 | 11/1939 | Garp-Thomas | 71/9 X |
| 2,639,902 | 5/1953 | Kuebler | 422/195 |
| 2,680,069 | 6/1954 | Eweson | 71/9 |
| 3,364,007 | 1/1968 | Redman | 71/9 |
| 3,756,784 | 9/1973 | Pittwood | 422/194 |
| 3,960,537 | 6/1976 | Kaelin | 71/9 |
| 4,193,786 | 3/1980 | Brill | 71/9 |
| 4,242,809 | 1/1981 | Elder | 71/9 X |

FOREIGN PATENT DOCUMENTS 2705720 8/1978 Fed. Rep. of Germany ............ 71/9

Primary Examiner—Robert J. Warden
Attorney, Agent, or Firm—Wenderoth, Lind & Ponack

[57] ABSTRACT

An apparatus for composting materials suitable for composting such as kitchen refuse or municipal refuse, in which rotary agitator units are provided above a plurality of horizontal floors, respectively so that the agitator units themselves are rotated simultaneously when the material such as kitchen refuse is charged onto the uppermost stage of the horizontal floors, the agitator units and said horizontal floors also being rotated relative to each other during which the charged material is agitated and moved on the horizontal floors, and the material is allowed to fall successively onto the floor below thereby effecting the composting operation.

11 Claims, 9 Drawing Figures

COMPOSTING APPARATUS

DESCRIPTION

The present invention relates generally to treatment of refuse and, more particularly, to a composting apparatus for converting organic materials in municipal refuse, such as kitchen refuse, into compost.

BACKGROUND OF THE INVENTION AND PRIOR ART

There have been various approaches to treatment of municipal refuse. In view of the fact that using refuse as landfill or incineration of refuse causes secondary problems, recent practical methods of municipal refuse treatment have been to reduce the volume of refuse or to treat the refuse for reuse as a resource. Particularly, the method of sorting municipal refuse for reuse has become more and more prevailing. Kitchen refuse which has been sorted out by the sorting method or kitchen refuse collected initially as such can be effectively converted into compost. Obviously the treatment capacity of a composting apparatus per unit area required for installing the apparatus can be made higher by increasing the height of the pile of the material. In practical operation, however, when the pile of the material is too high the material packs down into a mass in which air permeability is reduced, thereby retarding aerobic fermentation therein. This tendency is significant in material having a relatively high water content, such as kitchen refuse, organic sludge, and the like. The known multistage vertical cylindrical composting apparatus comprising a plurality of horizontal floors in which material is allowed to fall successively to the floor below can reduce the thickness of the layer of composting material on each floor relative to the single-stage composting apparatus and can, accordingly, eliminate some of the disadvantages mentioned above and increase the treatment capacity of the apparatus.

However, the conventional multistage vertical cylindrical composting apparatus, in which the material is moved by a rake rotating about a cylindrical shaft in conjunction with some agitation, has disadvantages in that substantial agitation of the material is not performed and a relatively large amount of power is required to rotate the rake of having a large radius while shearing the material between the rake and the floor. Another disadvantage of the material raking operation on the floor is that it tends to consolidate the material into dense masses resulting in insufficient agitation particularly in material of high water content, thereby retarding fermentation of the material. Consequently, in the conventional composting apparatus it is impossible to increase the thickness of the material in each stage and to expect a satisfactory agitation effect provided by the rake.

OBJECT AND BRIEF SUMMARY OF THE INVENTION

One object of the present invention is to provide a composting apparatus comprising agitator units having revolving beaters instead of a rake so that the agitator units and horizontal floors are moved relative to each other, thereby obviating the above disadvantages of the conventional composting apparatus—that is, reducing the amount of power required, preventing packing and massing of the material, and enabling efficient composting of material having a high water content.

The present invention provides a multi-stage composting apparatus comprising multi-stage vertical cylindrical tank provided with a series of horizontal floors in which the composting material is allowed to fall successively onto the floor below, characterized in that each of said horizontal floors is provided with at least one set of agitator units having revolving beaters and that each of said agitator units and said horizontal floors are supported so as to rotate relative to each other about the central axis of the cylinder of said cylindrical tank.

DETAILED DESCRIPTION OF THE INVENTION

Figure 1:
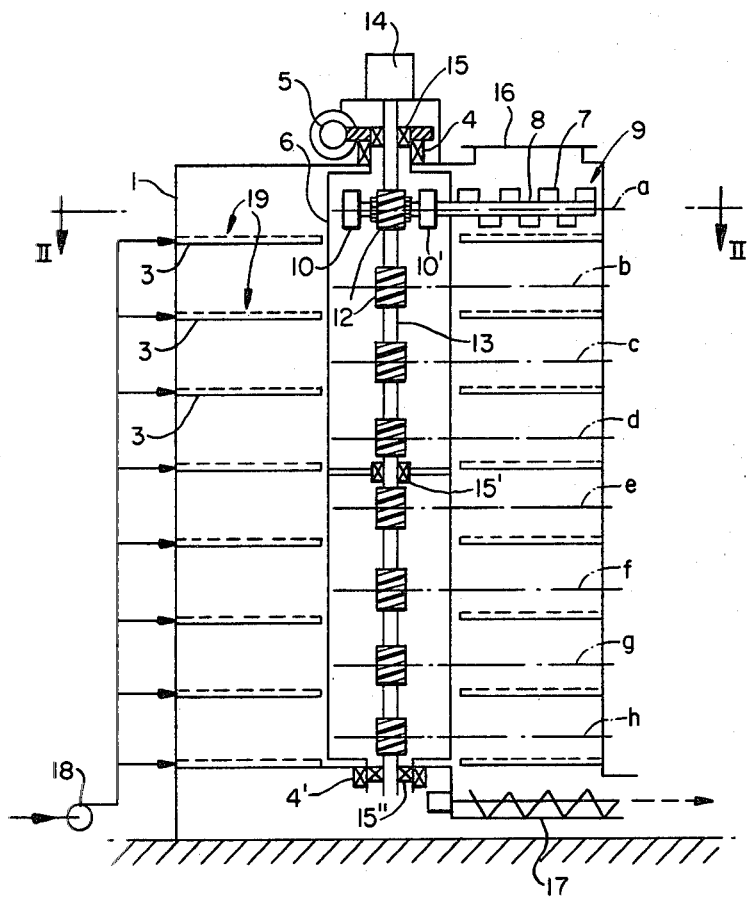
FIG. 1 is a schematic vertical sectional view of an embodiment of the present invention.

The present invention will now be described with reference to the drawings.

FIGS. 1 to 4 show a multi-stage composting apparatus comprising a series of horizontal floors 3 each floor having a compost passing opening 2, a vertical cylindrical tank 1 inside of which the plurality of said horizontal floors 3 is fixed to make a corresponding number of stages, a rotary agitator shaft 8 being disposed above each horizontal floor 3 and in parallel therewith, beaters 7 revolving about the axis of the agitator shaft 8, and a vertical rotary main shaft 6 supporting said agitator shafts 8 and rotating about the central vertical axis of said vertical cylindrical tank 1. The vertical rotary main shaft 6 which is supported in upper and lower bearings 4 and 4' is rotated by a driving device 5. A plurality of the beaters 7 is attached to each of the horizontally rotating agitator shafts 8 and are spaced in the longitudinal direction thereof along the horizontal axes (a), (b),—(h) of the respective shafts 8 above the horizontal floors 3, respectively. The agitator shafts 8 are hung from the main shaft 6 and supported by bearings 10 and 10' integral therewith to form an agitator unit 9 above each of the horizontal floors 3. A plurality of circumferentially spaced agitator units 9 may be used for each of the horizontal floors 3.

Figure 2:
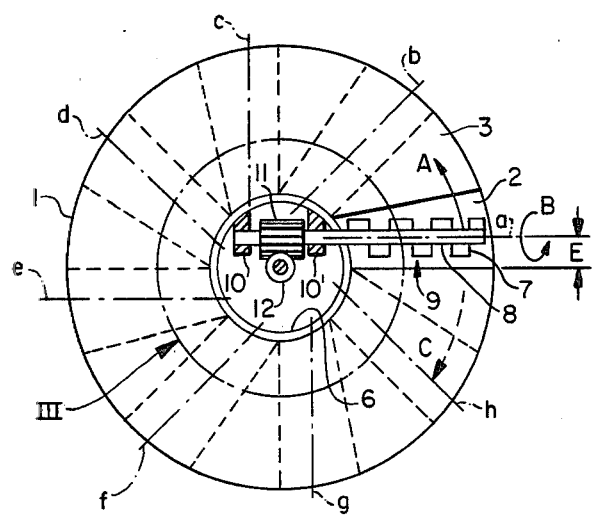
FIG. 2 is a sectional view taken along the line II—II of FIG. 1.

The agitator shafts 8 are not exactly radial but "substantially radial" with respect to the main shaft 6 because the agitator shafts 8 are, as shown in FIG. 2, attached thereto with a slight degree of eccentricity E. The axes of the agitator shafts 8 are, when seen in plan view as shown in FIG. 2, disposed out of phase, i.e. spaced circumferentially at substantially equal angles and the agitator shafts 8 are rotated in the direction of the arrow A (in the counterclockwise direction) by the rotation of the main shaft 6.

Figure 3:
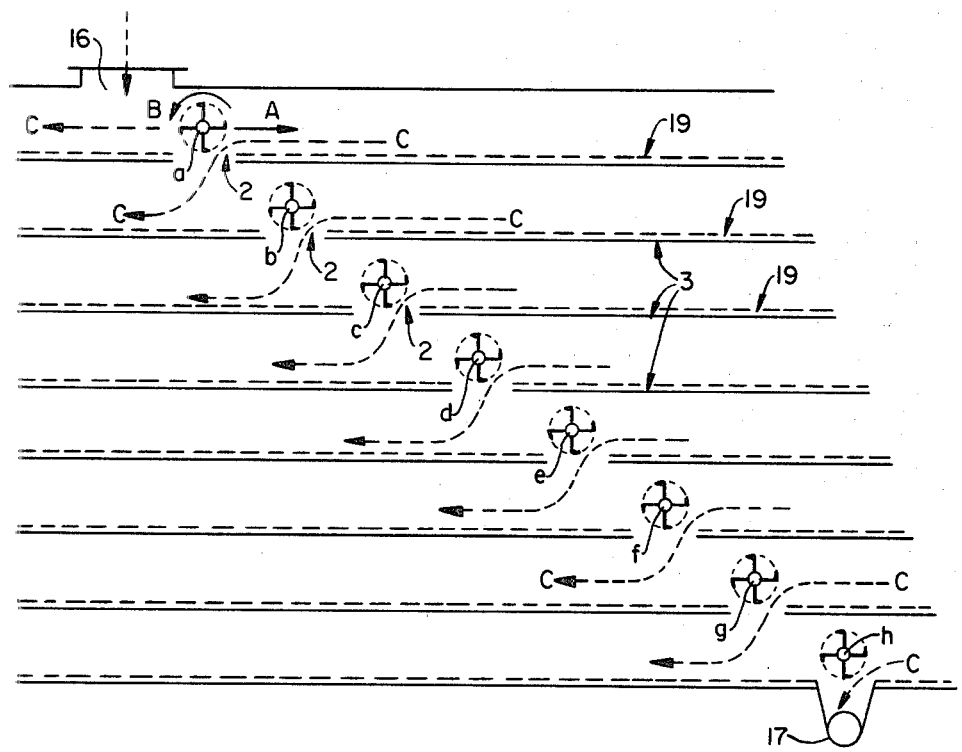
FIG. 3 is a developed view of a section taken along the circle III of FIG. 2.
Figure 4:
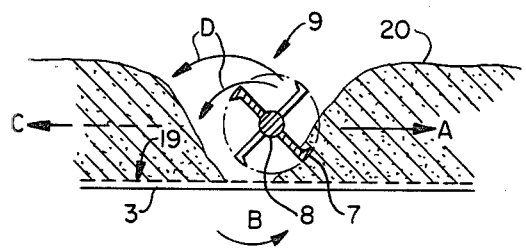
FIG. 4 is a view illustrative of the operation of beaters.

The compost passing opening 2 in each stage of the horizontal floors 3 is provided for allowing the compost to fall successively to the next lower of the floors 3. The compost passing openings 2 are, when seen in plan view, also out of phase as shown in FIGS. 2 and 3 in the same manner as are the agitator shaft axes so that, assuming that the direction of advancement indicated by the arrow A of the agitator unit 9 is positive, the compost passing openings 2 of the successively lower horizontal floors 3 are displaced in the positive direction relative to compost passing openings 2 of the successively higher horizontal floors 3. In this embodiment, since the pitch of the agitator shafts 8 is the same as the pitch of the compost passing openings 2, the agitator shafts 8 are simultaneously brought to the positions above the compost passing openings 2, respectively, as shown in FIGS. 2 and 3.

The agitator shafts 8 are connected to and driven by a driving motor 14 for revolving the beaters through helical gears 11 and 12 and a driving shaft 13. The driving shaft 13 is supported concentrically with the main shaft 6 in bearings 15, 15' and 15".

Numeral 16 denotes a material charging hole, 17 denotes a compost discharge screw, and 18 denotes a blower for supplying air to the interior of the tank 1 at each floor 3 through a plurality of air holes 19 provided in the upper surface of each of the horizontal floors 3.

The condition of the shafts 8 as shown in FIGS. 2 and 3, namely when an axis, for example the axis (b) of a shaft 8, is in a position ahead of the axis (a) of the shaft in the next higher state in the direction of rotation around main shaft 6, is hereinafter referred to as the axis (b) being advanced relative to the axis (a).

The operation of the embodiment of the construction described above will now be explained. When the main shaft 6 is rotated in the direction of the arrow A by the main shaft driving device 5 and, at the same time, the central shaft of the rotary agitator unit 9 is rotated in the direction of the arrow B by the motor 14, material 20 to be composted on each of the horizontal floors 3 is scraped up by the beaters 7 and thrown back in the paths D shown in FIG. 4 so as to given sufficient agitation and is thus moved in the direction of arrow C, opposite to the direction of the arrow A. In this way, the compost material 20 supplied through the material charging hole 16 is moved gradually on each horizontal floor 3 until it falls through the opening 2 to the next lower floor 3, being moved successively down the floors 3 and finally discharged out of the cylindrical tank 1 by the discharge screw 17. This operation is schematically illustrated in the developed views of FIG. 3, in which the material 20 charged through the hole 16 onto the uppermost floor 3 is moved in the path shown by the broken line in the direction of the arrow C around this floor until it falls through the opening 2 onto the next lower floor 3, and the same operation is repeated on successively lower floors until it finally reaches the discharge screw 17.

Accordingly, even in the case where the composting material is piled up so high or for so long a period of time as to pack down into an air-impermeable mass, as frequently happens with material containing a high percentage of water, the material is scraped up by the tips of the beaters 7 and broken into small lumps having considerably increased surface areas so as to be sufficiently aerated by the upward air flow from the air holes 19 while flying through the air and then piled on the floor very slowly and loosely with the result that the particles of material are brought into uniform contact with air supplied from the holes 19, and very satisfactory aerobic beaters penetrate the layer for scraping up of the composting material 20, i.e., the size of the lumps of scraped up composting material 20 can be arbitrarily varied by suitably selecting the speed of rotation of the central shaft 8 relative to the speed of rotation of the main shaft 6. Further, since the lumps of composting material 20 are removed from the layer by the revolving beaters 7, the resistance to the rotation of the main shaft 6 is significantly reduced, resulting in a substantial reduction in the power required compared to the conventional apparatus using a rake.

Figure 5:
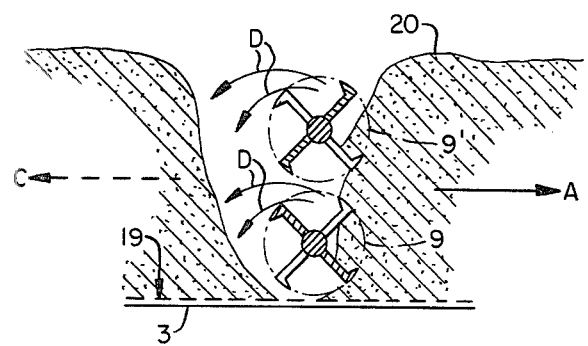
FIG. 5 is a view illustrative of operation of the beaters of a modification of the embodiment of FIGS. 1-4 in which two stages of agitator units are provided.
Figure 6:
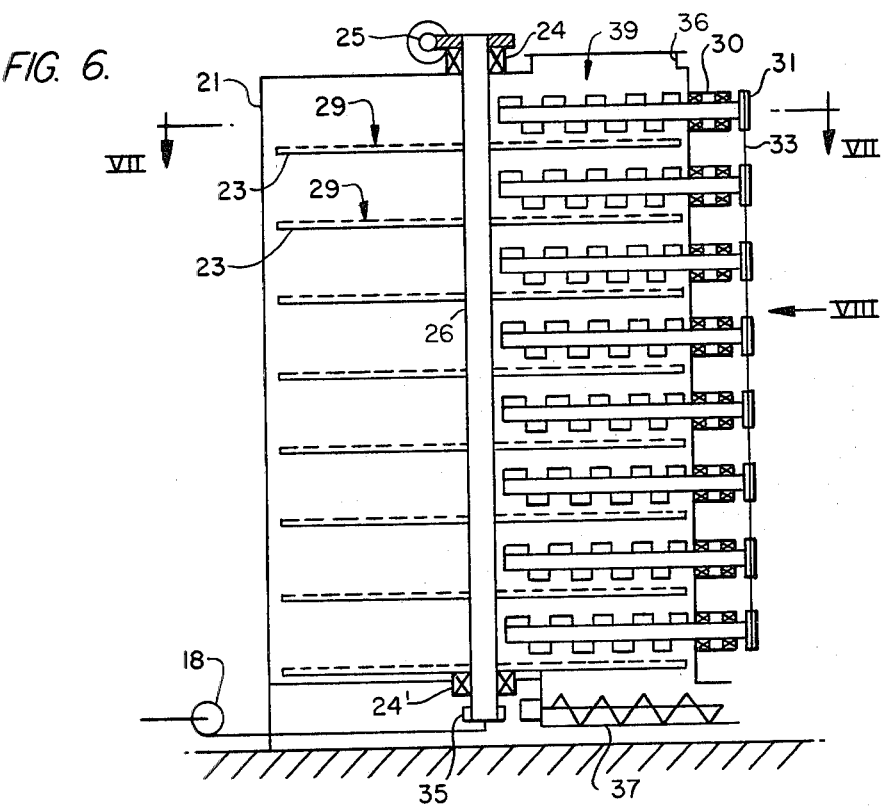
FIG. 6 is a schematic vertical sectional view of another embodiment of the present invention.
Figure 7:
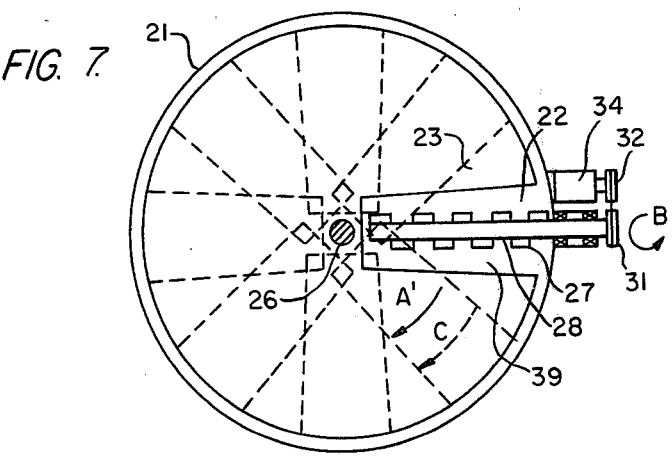
FIG. 7 is a sectional view taken along the line VII—VII of FIG. 6.

A plurality of agitator units 9 and 9' may be provided for each of the floors as shown in FIG. 5 for the purpose of increasing the height of the larger composting material piled on each of the floors. The operation of this modification is similar to that of the embodiment described above.

FIGS. 6 to 9 illustrate another embodiment of the composting apparatus according to the present invention, comprising a vertical cylindrical tank 21, a plurality of horizontal floors 23 rotatable about the vertical axis of said cylindrical tank 21 and each having a compost passing opening 22, and beaters 27 provided on horizontal rotary agitator shafts 28 above each of the horizontal floors 23, respectively, the shafts being journaled on the vertical cylindrical tank 21 and rotatable about the axis thereof, the axis in turn being stationary with respect to the ground.

Figure 8:
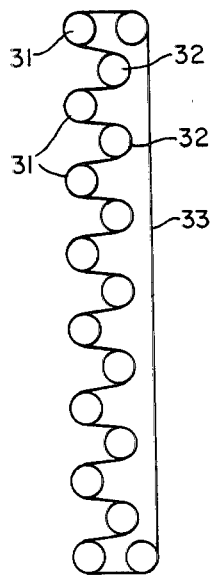
FIG. 8 is a view taken in the direction of the arrow VIII in FIG. 6.

At the center of the vertical cylindrical tank 21 is provided a main shaft 26 supported by upper and lower bearings 24 and 24' and rotated by a main shaft driving device 25. The plurality of the horizontal floors 23 is fixed to the main shaft 26. The upper surface of each of the horizontal floors 23 is provided with air holes 29 through which air is supplied by a blower 18 through an air passage (not shown) in a rotary coupling 35 in the center of the main shaft 16. The compost passing openings 22 are provided in the horizontal floors 23 at positions out of phase for the successive floors by an equal angle as in the aforedescribed embodiment. The horizontal agitator shaft 28 and beaters 27 each constitute a rotary agitator unit 39. The agitator shaft 28 of said unit is supported by a bearing 30 on the cylindrical tank 21 and is rotated by a motor 34 through sprocket wheels 31 and 32 and a chain 33 arranged as shown in FIG. 8. In the drawings, numeral 36 denotes a material charging hole and 37 denotes a compost discharge screw, respectively.

Figure 9:
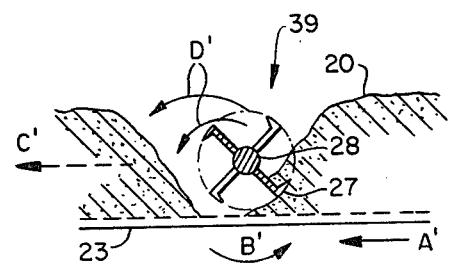
FIG. 9 is a view illustrative of operation of beaters of the embodiment of FIG. 6.

In operation, when the main shaft 26 is rotated by the main shaft driving device 25 in the direction of the arrow A' and, at the same time, the agitator shafts 28 of the agitator units 39 are rotated by the motor 34 in the direction of the arrow B', the composting material 20 piled up on each of the horizontal floors 23 is scraped up by the beaters 27 as in the aforedescribed embodiment, sent back along the path D' as shown in FIG. 9, and moved in the direction of arrow C' around the horizontal floor 23 until it falls through the compost opening 22 to the successive lower floors 3 and is finally discharged out of the cylindrical tank 21 by the compost discharge screw 37. The effects provided by this operation are the same as those explained with respect to the aforedescribed embodiment.

Results of experimental operations of the apparatus according to the present invention will now be described.

The material used in the experimental operations was municipal refuse having the components shown in Table 1:

TABLE 1

|  | (dry base %) |
|---|---|
| Kitchen refuse | 33.0 |
| Paper | 43.9 |
| Glass | 10.8 |
| Metal | 0.6 |
| Plastics | 7.0 |
| Other | 4.7 |

An apparatus of the type corresponding to that of FIG. 1 was used. Dimensions of the apparatus used in the test operations were as follows:

| Cylindrical tank: | |
|---|---|
| Inside diameter | 6 meters |
| Height | 7.5 meters |
| Number of stages: | 4 |
| Speed of rotation of the main shaft: | |
| 15 minutes per revolution | |
| Speed of rotation of the driving shaft: | 140 r.p.m. |
| Amount of air blown: | 0.2 m$^3$/min. |

Each day, five hundred kilograms of the material having the components shown in Table 1 was divided into three batches and charged in the apparatus having the dimensions set forth above. For each batch, the apparatus was operated for the period of time required to make one rotation of the main shaft. The depth of each batch piled on the floor was approximately 600 millimeters. The experimental operation was carried out for a period of fourteen days with the results shown in Table 2:

TABLE 2

| Charged Material | |
|---|---|
| Total weight | 6.9 ton |
| Total volume | 15.6 m$^3$ |
| Apparent specific gravity | 0.44 ton/m$^3$ |
| Water content | 54.5% |
| Discharged Material | |
| Total weight | 4.5 ton |
| Total volume | 7.9 m$^3$ |
| Apparent specific gravity | 0.57 ton/m$^3$ |
| Water content | 52.2% |
| Amount of change | |
| Lost weight | 2.4 ton |
| Ratio of weight reduction | 65% |
| Ratio of volume reduction | 51% |
| Weight reduction (dry base) | 68% |

In the experimental operation, the temperature of the material fell by 10°–15° C. during agitation, but the temperature of the material was restored to the same as that sensed before the agitation in approximately five hours. The highest temperature of the material sensed during the experimental operation reached 77° C.

In composting municipal refuse having the components shown in Table 1, those components not suitable for composting such as metal, glass and the like must, of course, be separated from the material for composting.

The aforementioned dimensions of the apparatus and the conditions used for the experimental operation such as the number of rotations, the period of time of operation, interval of operation, and the like are solely for illustrative purposes and can be changed in accordance with the specific requirements.

While the apparatus according to the present invention has been described hereinabove in connection with the composting of municipal refuse such as kitchen refuse, it is to be clearly understood that this description is made only by way of example and not as a limitation on the type of material to be treated thereby. In fact, the apparatus according to the present invention is applicable to any organic material that is suitable for composting.

The composting apparatus according to the present invention comprises a vertical multistage cylindrical tank enclosing a plurality of horizontal floors provided with openings for allowing the composting material to fall sucessively from one floor onto the floor below, each of said horizontal floors being provided with at least one set of agitator units having revolving beaters and each of said agitator units and each of said horizontal floors are supported so as to rotate relative to each other about the central axis of the cylindrical tank. Accordingly, the present invention provides an improved composting apparatus having significant advantages in that the treatment capacity per unit installation area of the apparatus can be considerably increased, the amount of power required therefor can be reduced, and packing down and densification of the material can be prevented to thereby permit sufficient agitation and enable efficient composting of material even with a high water content.

We claim:

1. A multistage composting apparatus comprising: a vertical cylindrical tank having a plurality of horizontal floors with apertures therein for allowing composting material to fall successively from one floor onto the floor below, each of said horizontal floors having at least one agitator unit having revolving beaters and said horizontal floors and said agitator units are supported for being rotatable relative to each other about the central vertical axis of said cylindrical tank, and means connected to said beaters for rotating said beaters at all times at a speed for scraping up the material lying in front of said beaters and throwing the scraped material over and rearwardly of said beaters with respect to the advancing direction of said units during relative rotation between said floors and said units.

2. A composting apparatus as claimed in claim 1, in which said horizontal floors are fixed to said cylindrical tank and said agitator units are rotatable about the central axis of said cylindrical tank.

3. A composting apparatus as claimed in claim 2, in which said apparatus has a vertical rotary shaft in the center of said tank, and said agitator units are connected to said vertical rotary shaft.

4. A composting apparatus as claimed in claim 1, in which each of said agitator units has a rotary horizontal shaft mounted for rotation around said vertical axis, and a plurality of beaters distributed longitudinally along said horizontal shaft and rotatable therearound.

5. A composting apparatus as claimed in claim 4, in which said horizontal shafts of said agitator units extend substantially radially relative to the central vertical axis of said cylindrical tank.

6. A composting apparatus as claimed in claim 5, in which the horizontal shafts on the respective floors are disposed out of phase from the horizontal shafts on the other floors.

7. A composting apparatus as claimed in claim 6, in which there is a single opening in each of said horizontal floors through which the composting material can fall to the horizontal floor below, said openings being slot-like openings extending substantially radially with respect to the central vertical axis of said cylindrical tank.

8. A composting apparatus as claimed in claim 7, in which the successive slot-like openings from the top floor to the bottom floor are successively circumferentially offset in the same direction from the opening in the next higher floor.

9. A composting apparatus as claimed in claim 8, in which the slot-like opening in a lower horizontal floor is disposed in a position in advance of that of the opening in the next higher horizontal floor relative to the advancing direction of said agitator units.

10. A composting apparatus as claimed in claim 7 wherein the horizontal rotary shaft on each floor is positioned ahead of, in the direction of rotation around the central vertical axis, of the horizontal rotary shaft on the next higher floor.

11. A composting apparatus as claimed in claim 1, 2, 3, 4, 5, 6, 7, 8, 9, or 10, in which each of said horizontal floors has a plurality of sets of agitator units positioned one above the other.

* * * * *